United States Patent [19]

Guder

[11] Patent Number: 5,468,795
[45] Date of Patent: Nov. 21, 1995

[54] METHOD FOR PRIMING WET OR DRY ROAD SURFACES

[75] Inventor: Harald Guder, Wuppertal, Germany

[73] Assignee: Minnesota Mining and Manufacturing Company, St. Paul, Minn.

[21] Appl. No.: 79,158

[22] Filed: Jun. 17, 1993

[51] Int. Cl.$^6$ ............... C08K 5/07; F21V 7/22; E01C 7/00
[52] U.S. Cl. .......... 524/361; 524/356; 524/360; 524/364; 524/59; 524/64; 523/172; 404/14; 404/16; 404/67
[58] Field of Search ............... 524/361, 364, 524/365, 356, 360, 59, 64; 523/172; 404/14, 16, 67

[56] References Cited

U.S. PATENT DOCUMENTS

| | | | |
|---|---|---|---|
| 3,468,834 | 9/1969 | Oda et al. | 524/365 |
| 3,518,107 | 6/1970 | Millen | 117/72 |
| 3,902,939 | 9/1975 | Eigenmann | 156/71 |
| 3,972,848 | 8/1976 | Lakshmanan | 524/365 |
| 3,991,002 | 11/1976 | Sadlo | 524/363 |
| 4,069,281 | 1/1978 | Eigenmann | 404/16 |
| 4,906,523 | 3/1990 | Bilkadi et al. | 428/327 |
| 5,139,590 | 8/1992 | Wyekoff | 404/14 |
| 5,180,766 | 1/1993 | Hayama et al. | 524/356 |

FOREIGN PATENT DOCUMENTS

| | | |
|---|---|---|
| 0309276A3 | 3/1989 | European Pat. Off. . |
| 0359521A2 | 3/1990 | European Pat. Off. . |
| 0488526A1 | 6/1992 | European Pat. Off. . |
| 3216388A1 | 11/1983 | Germany . |
| 1154504 | 6/1969 | United Kingdom ............ 524/365 |

OTHER PUBLICATIONS

Database WPI, Week 7947, Derwent Publications Ltd., London, GB; AN 79–84907B & JP A 54 131 632, Oct., 1979.

Database WPI, Week 8310, Derwent Publications Ltd., London, GB; AN 83–43079K & JP A 58 052 367.

Patent Abstracts of Japan & JP A 53 056 231, May, 1978.

*Primary Examiner*—Paul R. Michl
*Assistant Examiner*—Olga Asinovsky
*Attorney, Agent, or Firm*—Gary L. Griswold; Walter N. Kirn; Robert H. Jordan

[57] ABSTRACT

Priming composition containing a homogeneous liquid solution containing a polymeric material and at least one water-miscible solvent in an amount sufficient to provide adhesion between wet or dry road surface materials and adhesive coated articles. The priming composition allows the marking of roadways with pressure sensitive adhesive articles even on wet or damp roadway surfaces. Also a method for priming roadway surfaces.

16 Claims, No Drawings

METHOD FOR PRIMING WET OR DRY ROAD SURFACES

FIELD OF INVENTION

This invention relates to a priming composition for roadway markings. This invention also relates to a method using such compositions to prime wet or dry road surfaces for adhesion of adhesive-backed pavement markings.

BACKGROUND

It has long been known that roadway marking materials can be adhered to roadway surfaces such as concrete and asphalt by means of pressure sensitive adhesives. EP 91 309 941 discloses a pavement marking material comprising a top layer, an optional base sheet and layer of adhesive wherein the adhesive comprises a rubber and a high-loading of tackifier. Such adhesives have been found to exhibit exceptional impact shear resistance. U.S. Pat. No. 3,902,939 (Eigenmann) discloses a pavement marking tape material which utilizes an adhesive which is not tacky at room-temperature but which is activated by a hot primer layer or solvent to provide adhesion to pavement surfaces.

It is also known from many branches of adhesion science that wet or damp surfaces are very difficult to adhere to. Adhesion to wet roadway surfaces for the purpose of either temporary or permanent marking of traffic lanes, for example, continues to be problematic, especially in regions where road surfaces are often damp or wet during a large part of the year.

Currently, adhesion to these substrates is typically improved somewhat by two means. Often a flame torch is used to dry the roadway—a labor intensive and thus expensive process. Commonly, a polymeric primer in organic solvent is brushed or sprayed onto the surface before the pressure sensitive adhesive-coated pavement marking is applied. From U.S. Pat. No. 4,906,523 (Bilkadi et al.), primers such as organosols are known. Furthermore, the use of solutions of high molecular weight rubbers in organic solvents as primers are known. Problems still exist, however, in that traffic markings applied to damp surfaces using these primers continue to separate from the roadway after short exposures to traffic and continued weathering.

As known primer systems there are used synthetic rubber-based pressure sensitive adhesives in organic solvents. In these pressure sensitive adhesive systems a mixture of a rubber like styrene-isoprene-styrene block copolymers and resin materials of terpene-based aliphatic hydrocarbon resins are used. Usually solvent systems are used, because rubber and resin components must typically be dissolved in different solvents. By combining the different solvents it could be possible that the system becomes incompatible, for example, by partial precipitation of the solids or phase separation and the like. A further drawback of the use of a solvent systems is that the priming composition itself might be altered, for example, due to the preferred evaporation of one of the solvents. Here also problems arise based on incompatibility of the solvents of the rubber or the resin respectively.

Another system is based on a neoprene rubber in different organic solvent systems, however, these neoprene high molecular weight rubbers are difficult to be kept in solution. A further system is known consisting of polybutadiene and bitumen in non-polar aliphatic hydrocarbon solution. Still another system is a rubber-based pressure sensitive adhesive in a chlorinated hydrocarbon such as methylene chloride. We believe that these systems described above do not address the problem of providing improved adhesion to wet and dry road surfaces.

SUMMARY OF INVENTION

The present invention provides a composition that is a primer for the adherence of adhesive-coated articles to wet or dry road surface materials and a method utilizing such composition to prime roadway surfaces. The invention particularly provides a priming composition comprising a homogeneous liquid solution containing polymeric material and at least one water-miscible solvent in an amount sufficient to provide improved adhesion between wet and dry road surface materials and adhesive-coated articles.

The road surface materials to which the priming composition of the invention can be applied include the commonly used materials for road constructions such as bituminous or concrete surfaces or for example paving-stones. Of course, preparation of the road surfaces is recommended; e.g., removal of loose materials from the surface to be treated with the primer of the invention.

The priming composition is suitable to be used with known preformed pavement marking tapes. Preferably, rubber/resin based pressure sensitive adhesives and the priming composition of the invention can be used. Preferred rubber resins are those comprising tackified rubber, e.g., tackified hydrocarbon resins containing plasticizers such as hydrocarbon oils. Also road marking materials with acrylate-based pressure-sensitive adhesive ("PSA") can be used in combination with the priming composition of the invention.

DETAILED DESCRIPTION OF ILLUSTRATIVE EMBODIMENTS

The polymeric material is any material that can be dissolved in the water-miscible solvent and leaving, after evaporation of the solvent, a residue. The residue forms preferably an unitary or continuous layer. This layer should not be so thick that the road marking materials are encouraged to slip. However, the amount of priming composition applied should provide a continuous layer or film residue of polymeric material, e.g., rubber-based PSA after evaporation of the solvent.

Preferably the priming composition of the invention is spread on the area of surface to be marked by casting, spraying, or brushing. When the solvent is evaporated the residue forms an anchor layer between the surface to be marked and the adhesive coated article.

The polymeric material must improve adhesion between the wet and dry road surface materials and the adhesive coated articles as compared to using the water-miscible solvent alone. Furthermore, the polymeric material must be soluble in the solvent to be used and should be compatible with or to some extent soluble in the adhesive layer of the adhesive-coated article.

Preferably, polymeric materials such as hydrocarbon resins can be used. The hydrocarbon resin is preferably a thermoplastic polymer. The polymeric material of the composition of the invention can be derived from petroleum resin, terpene resin or coal tar. The polymeric material which can be used according to the invention can be derived by polymerizing the unsaturated ingredients of the different resins mentioned above. The hydrocarbon resins to be used according to the invention also include polymers of styrene monomers or polymers which are obtained by polycondensation as long as they are soluble in water-miscible solvents. Preferably the resins are saturated hydrocarbons. The number average molecular weight $M_n$ of the hydrocarbon resin advantageously does not exceed 50,000 measured by gel permeation chromatography ("GPC") analysis in a tetrahydrofuran solution.

Preferably, the number average molecular weight of the hydrocarbon resin is in the range of about 500 to 5,000. For example, hydrocarbon resins which are commercially available include those sold under the trademark ESCOREZ™ by Exxon Corporation. As an example for a synthetic hydrocarbon resin there can be mentioned a polymerization product of styrene and cyclic aliphatics like terpenoid structures as well as minor amounts of unsaturated cyclic anhydrides. Such resins are available, for example, from Reichold Chemical Company.

The solvent for the polymeric material used in the priming composition of the invention can be either a single water-miscible solvent or a water-miscible mixture of solvents. The term "water-miscible solvent" according to the invention means a solvent which is at least partially miscible with water; preferably water-miscible in a wide range of proportions. The solvent seems to be able to carry the polymeric material into the pores, capillaries, or cavities of the roadway surface. If the roadway surfaces are covered with a damp layer or film the solvent seems to mix with the water giving rise to an intimate contact of the priming composition with the roadway surface.

The volatility of the solvent at atmospheric pressure should not be too high. The solvent should not evaporate until an intimate contact of at least a portion of the solvent with the damp surface of the road material has taken place; otherwise the desired effect of the solvent for the priming polymeric material may not appear. Preferably the water-miscible solvent for the priming composition has a boiling point of from about 50° to 150° C., more preferably from about 60° to 130° C.

The water-miscible solvent which can be used according to the invention is an organic solvent which is at least partially miscible with water. Preferably it is a polar non-protic solvent. More preferably the solvent is capable of forming a azeotropic mixture with water. According to the invention it is advantageous to use as water-miscible solvent lower aliphatic ketones such as acetone, methyl ethyl ketone, methyl isobutyl ketone, and the like.

The lower aliphatic ketones having 3 to 10 carbon atoms are preferred. Some of the preferred lower aliphatic ketones are miscible to a great extent with water are able to form an azeotropic mixture with water and/or have comparably low boiling points. From these solvents the polymeric materials preferably do not precipitate when the damp or wet surface of the roadway comes into contact with the priming composition of the invention. Non polar or polar protic solvents can also be present in the priming composition. However, the latter solvents should not precipitate the polymeric material from the priming composition.

The amount of solids in the priming composition can be selected dependent, for example, upon the application conditions, or the solvent used, or the temperature of the ambient air or the road surface, and so on. Preferably the content of solids in the priming composition is between about 1 and 50 percent by weight, more preferably between about 5 and 35 or between 10 and 25 percent by weight. Predominantely the content of solids is formed by the polymeric material.

The amount of solids deposited for forming the residue strongly depends on the structure of the road-material surface. For example, the rougher the surface to be treated is the more solids should be deposited on it. A preferred amount of residue formed by the solids of the priming composition of the invention is in the range of from about 50 to 500 grams/meter² (g/m²), more preferably from about 100 to 300 g/m² solid residue left on the surface of the road-material after evaporation of the solvent. For example, in a typical application condition one can apply a 20 liter (l) can having a solid content of about 25 percent on about 400 meter (m) lengths, if the composition is, e.g., sprayed in about centimeter (cm) width.

It can be advantageous to add small amounts of hydrophobic additives like fumed silica (such as AEROSIL™ 972 Silica from Degussa) in order to avoid hydrolytic attack of the construction comprising the adhesive coated article, the priming layer and the road surface. Preferably the amount of fumed silica does not exceed 5 percent by weight based on total amount of solids in the priming composition of the invention, in order not to decrease the compatibility of the primer solution with water present on or in the road surface materials.

Marking a road using the priming composition of the invention is carried out by applying to the road surface a priming composition as described herein. Preferably, the polymeric material in a liquid solution with at least one water-miscible solvent is applied on the roadway to be marked by casting, spraying or brushing in the area intended for marking. The spraying can be performed by using conventional applicators, for example, a primer spray applicator PS 14 distributed by Minnesota Mining and Manufacturing Company ("3M").

Adhesive-coated road marking articles such as marking tapes can be applied after evaporation of the solvent of the priming composition of the invention. The adhesive-coated articles can typically be applied 10 to 20 minutes after application of the priming composition of the invention. Of course, this time depends among other things, for example, on the volatility of the solvents of the liquid solution or environmental conditions. The priming composition of the invention is advantageous because drying of damp areas of a road surface material to be marked can be avoided. Preferably, the marking tapes are tamped with a roller after adhesion to road surface. Therefore, the speed of application increases from a few hundred meters per hour to 5 to 10 kilometers per hour. Moreover, because wet or damp surfaces can be marked with pressure sensitive adhesive articles, the season for carrying out such operations is dramatically enlarged, substantially only limited by outdoor temperatures. For example, in Central Europe where rainfall is likely all year round and the relative humidity is generally high the marking of roads with pressure sensitive adhesive coated tapes could previously be carried out only on very few days when the road surface was ideally dry.

In general, the use of the priming composition is not restricted by ambient temperatures except for the fact that the priming composition of the invention typically cannot be used effectively on frozen road surfaces. If the road remains frozen after application of the priming composition, advantageous effects, e.g., the mixing with water do not occur. In any event, if the temperatures are too low the pressure sensitive marking materials are generally too stiff for providing a good adhesion on the road surfaces.

On the other hand if the temperatures are higher than, e.g., 40° C. for some time then it is no longer necessary to apply a priming composition for wet or damp road surfaces. In this case the application is limited by economical rather than technical reasons.

When using the priming composition of the invention the time window of application is dramatically increased. Generally speaking the lower the ambient temperature and the more humid the environmental conditions or the lower the air-circulation the longer one should wait before the adhesive coated articles can be placed on the primed road surface. For example, if 100 to 300 g/m$^2$ are applied on a concrete or bituminous surface at relative humidity of 70 to 80 percent, about 15° C. and only little wind, one should wait about 20 minutes before the adhesive coated articles are applied on the primed areas of the road surface.

The residue which is left after evaporation of the solvent or solvent mixture shows excellent adhesion to road surface materials such as concrete and asphalt and to articles which are coated with pressure sensitive adhesive, for example commercially available pavement marking tapes. In the dissolved condition the resin may penetrate the substrate providing a mechanical anchorage layer to the road material surfaces. Furthermore, the resin may seal the holes and capillaries of the road surface substrates and thus prevents water and humidity rising through these channels and contacting the adhesive surfaces of the marking tapes. Therefore the priming composition of the invention provides an adhesion between wet or dry road surface materials and adhesive-coated articles.

EXAMPLES

The invention is further illustrated by the following non-limiting examples.

The test method used for assessing the properties of the priming composition according to the invention is as follows.

Substrate Preparation

Smooth asphalt blocks of the dimensions 395 millimeters (mm)×200 mm×50 mm were obtained from Baugesellschaft Fritz Mueller mbH, Cologne, Germany. The blocks were identical in composition to those required by the Bundesanstalt für Straβenwesen, Federal Institute for Roads and Streets, wear simulator. The asphalt blocks were treated by three separate methods to produce a dry surface, a damp surface, and a wet surface to serve as substrates for a 90° peel adhesion test.

Dry surface: The substrate was stored in the laboratory at room temperature and ambient humidity for two weeks.

Damp surface: The surface of the substrate was rinsed with tap water for five minutes and then allowed to stand with the test surface in a vertical position for fifteen minutes before the pavement marking sample was applied. The substrate appeared to be wet, but no standing water was present.

Wet surface: The surface of the substrate was rinsed with tap water for five minutes as above, but allowed to remain in the horizontal position for fifteen minutes before the pavement marking sample was applied. Standing water was present on the substrate.

Application Of Primers

Primer solutions were applied to the asphalt substrates described above by spraying or brushing. The treated asphalt was allowed to remain at room temperature and ambient humidity for twenty minutes.

Pavement Marking Application

Samples of removable temporary pavement marking were cut into strips with a width of 2.54 cm and a length of approximately 30 cm. The pavement markings used were based on natural or synthetic rubber having tackifiers, plasticizers and fillers. Strips of the commercially available pavement marking materials having a coating of pressure sensitive adhesive (SCOTCHLANE Brand 5711 Pavement Marking or SCOTCHLANE Brand A641 Pavement Marking, 3M, Saint Paul, Minn. USA) were applied to the substrates by hand and were then pressed onto the substrate using maximum pressure by means of four passes with a rubber-coated handroller. A period of twenty minutes passed before the following test measurement was made. This preparation was carried out at room temperature.

Measurement Of 90° Peel Force

One end of pavement marking test strip was separated from the substrate and clamped in a mechanical jaw fixed in an apparatus designed to pull the pavement marking away from the asphalt substrate at a 90° angle and at a constant speed of 15 mm/second. The force required was recorded on an electronic strip recorder driven by output from a measuring element capable of recording forces of up to 100 Newtons. An average value for the steady state force generated during the peeling was determined by drawing the best straight line through the graphically displayed recorder output. Measurements were recorded in Newtons per cm width.

Examples 1 to 3 and Comparative Example A 10 percent by weight hydrocarbon resins were dissolved in methyl ethyl ketone and then applied to substrates as described above. The 90° peel force required was recorded and the values are given in Table 1. A control experiment (Example A) was applied according to the same protocol but not using the priming composition.

TABLE 1

| Example | 90° peel (N/cm) on substrate | | |
|---|---|---|---|
| | dry | damp | wet |
| 1 | 2.3 | 1.6 | 1.1 |
| 2 | 2.7$^a$ | 2.3 | 1.9 |
| 3 | 3.3 | 2.3 | 1.5 |
| A | 2.0 | 0 | 0 |

In Example 1 there was used Reichold ER 8150, a hydrocarbon resin having phenolic functionality, in Example 2 Exxon No. 1137 was used, and in Example 3 Exxon No. 1102 hydrocarbon resin was used.

Examples 4 to 6 and Comparative Example B

Outdoor experiments were carried out on a private truck loading area where pavement markings are subjected to extreme pressure and shear force from truck maneuvers. About 250 vehicles per day drove over the pavement markings.

Water was poured on an asphalt surface and evenly distributed with a broom. After 20 minutes the substrate was still wet with some standing water on top. The priming composition as prepared according to examples 1 to 3 were applied with a paint-roller. Another 20 to 30 minutes later 10×30 cm samples of rubber based SCOTCHLANE Brand Detour Grade Pavement Marking Tape, from 3M, were applied perpendicular to traffic direction and tamped in three trips with the RTC-2 Roller Tamper Cart equipped with 90 kg weight. 90° peel values were taken 20 minutes after the application. 90° peel adhesion values were also measured two months after the application.

Table 2 shows the numerical results of the 90° peel (N/cm). In Example 4 a priming composition containing Reichold ER 8150 was used, in Example 5 the composition contained EXXON 1137, and in Example 6 the composition contained EXXON 1102 as hydrocarbon resin. The unprimed control (Example B) yielded the indicated 90° peel value when applied on a dry surface. A further control experiment carried out without any priming composition of the invention on a wet surface of the road material failed immediately after application of the marking tapes. These results illustrate the marked improvement made possible by the use of priming compositions of the invention.

TABLE 2

| | 90° peel (N/cm) | |
| --- | --- | --- |
| Example | 20 min. after applcn. on a wet surface | 2 months after applcn. on a wet surface |
| 4 | 1.6 | 2.7 |
| 5 | 1.9 | 1.6 |
| 6 | 2.3 | 4.5 |
| | 20 min. after applcn. on a dry surface | 2 months after applcn. on a dry surface |
| B | 2.2 | 1.6 |

Various modifications and alterations of this invention will become apparent to those skilled in the art without departing from the scope and spirit of this invention.

What is claimed is:

1. A method of bonding an adhesive-backed preformed pavement marking to a road surface comprising, in order:

(a) applying a priming composition to said road surface, said priming composition comprising a homogeneous liquid solution containing polymeric material and at least one water-miscible solvent in an amount sufficient to provide adhesion between wet or dry road surface materials and adhesive-coated articles, said polymeric material comprising an aromatic and/or aliphatic hydrocarbon resin and/or hydrocarbon resin having phenolic functionality;

(b) permitting said solvent to evaporate such that a residue forms on said road surface; and (c) applying an adhesive-backed preformed pavement marking over said residue on said road surface.

2. The method of claim 1 wherein said adhesive-coated article is coated with a pressure sensitive adhesive based on tackified rubber resin.

3. The method of claim 1 wherein said priming composition is applied by casting, spraying, or brushing.

4. The method of claim 1 wherein the weight of residue left on the road surface after evaporation of said water-miscible solvent is in the range of from about 50 to 500 grams/meter$^2$.

5. The method of claim 1 wherein said road surface is wet.

6. The method of claim 1 wherein the number average molecular weight of said hydrocarbon resin does not exceed 50,000.

7. The method of claim 1 wherein said water-miscible solvent comprises an organic polar non-protic solvent.

8. The method of claim 1 wherein said solvent is capable of forming an azeotropic mixture with water.

9. The method of claim 1 wherein said solvent is a ketone.

10. The method of claim 1 wherein said solvent is a ketone having 3 to 10 carbon atoms.

11. The method of claim 1 wherein said solvent is selected from one or more of the following: acetone, methyl ethyl ketone, and methyl isobutyl ketone.

12. The method of claim 1 wherein the content of solids in the priming composition is between about 1 and 50 percent by weight.

13. The method of claim 1 wherein said composition further comprises one or more hydrophobic additives.

14. The method of claim 3 wherein said hydrophobic additive is fumed silica.

15. The method of claim 1 wherein said preformed pavement marking comprises the adhesive layer on the back of a pressure-sensitive adhesive.

16. The method of claim 15 wherein said adhesive layer comprises an adhesive selected from the following: rubber/resin-based pressure-sensitive adhesive and acrylate-based pressure-sensitive adhesive.

* * * * *